July 27, 1948. J. D. McKELLAR Re. 23,020

AIRPLANE CONTROL SYSTEM

Original Filed Sept. 4, 1937 3 Sheets-Sheet 1

INVENTOR.
JOHN DONALD McKELLAR
BY
Herbert E. Metcalf
Attorney

AIRPLANE CONTROL SYSTEM

Original Filed Sept. 4, 1937 3 Sheets-Sheet 2

INVENTOR.
JOHN DONALD McKELLAR
BY
Herbert E. Metcalf
Attorney

AIRPLANE CONTROL SYSTEM

Original Filed Sept. 4, 1937 3 Sheets-Sheet 3

INVENTOR.
JOHN DONALD McKELLAR
BY
Herbert E. Metcalf
Attorney

Reissued July 27, 1948

Re. 23,020

UNITED STATES PATENT OFFICE 23,020

AIRPLANE CONTROL SYSTEM

John Donald McKellar, Long Beach, Calif., assignor to Northrop Aircraft, Inc., Hawthorne, Calif., a corporation of California Original No. 2,173,538, dated September 19, 1939, Serial No. 162,494, September 4, 1937. Application for reissue March 20, 1946, Serial No. 655,776

9 Claims. (Cl. 244—13)

My invention relates to improvements in the control system of an airplane with particular application to tailless airplanes. The object of my invention is to provide longitudinal, directional, and lateral control of an airplane, without the use of a tail or vertical control surfaces.

Longitudinal control is accomplished by deflecting control units at the trailing edge of the wings upward or downward.

Lateral control is accomplished by a differential movement of said control units so that on one side of the airplane the control unit moves upward, while on the opposite side the other control unit moves downward.

Directional control is accomplished by separating the upper and lower surfaces of the control unit on the side toward which the turn is to be made in order to increase the aerodynamic drag on that side of the airplane and thus produce a yawing moment.

The device is unique in that a single control unit is provided on each semi-span of the airplane wing which will produce the required pitching, rolling, and yawing moments independently and/or simultaneously.

The device is also unique in that the sinking speed of the airplane may be increased by spreading or separating the upper and lower surfaces of both directional controls at the same time and thus increasing the drag of the airplane without producing a yawing moment. This feature will allow the glide path of the airplane to be varied without changing the setting of the flap or high lift device.

In addition, this deflection of the upper and lower surfaces of both control units can be utilized to cause the lower surfaces of the control units to act as flaps or high lift devices, and also to cause the upper surfaces of the control units to act as boundary layer control devices and thus increase the lift available, and delay the stall of the wing surfaces ahead of said control units.

One method of obtaining these objects is illustrated in the accompanying drawings. For simplicity, I have used cable operation, although push-pull tubes, or torque tubes, could be used to operate the device. The system is symmetrical and a unit such as would be used on the wings is described in detail. Similar numerals refer to similar parts throughout the several views.

Figure 1:
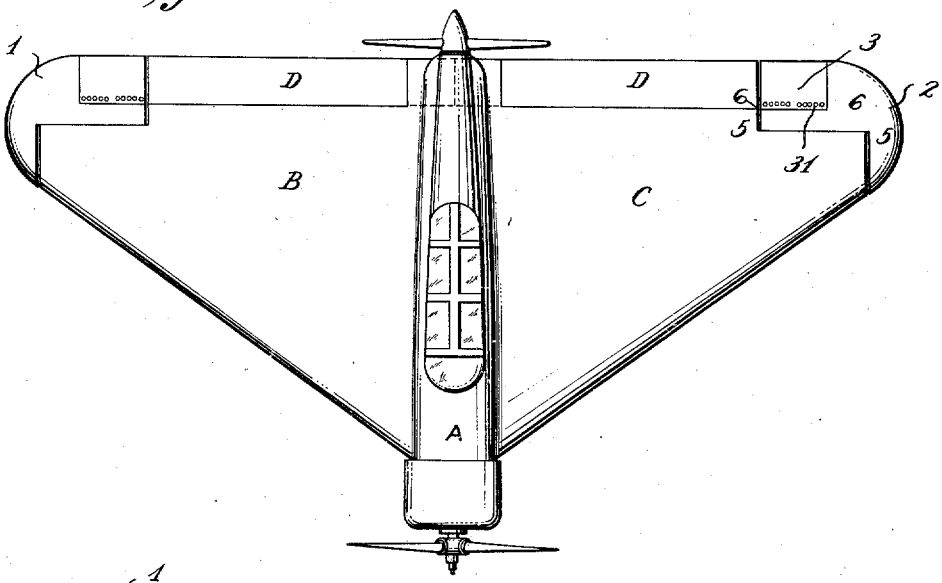
Figure 1 is a plan view of an airplane using my control system.
Figure 2:
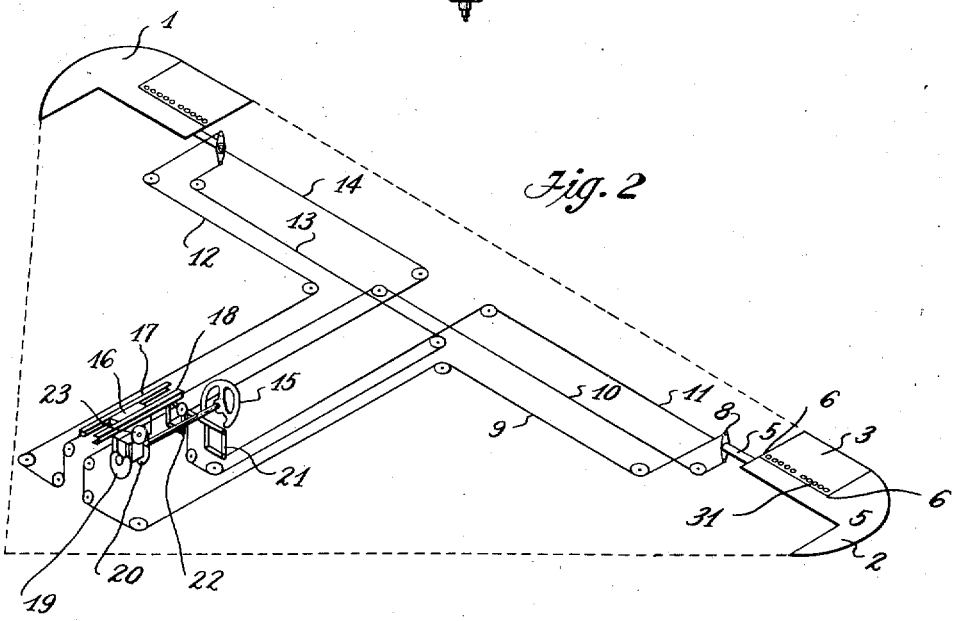
Figure 2 is an isometric, schematic drawing showing the cable control arrangement required to operate the control units.

The tailless airplane illustrated in Figures 1 and 2 comprises a central crew carrying portion or fuselage A having lifting wings B and C on each side thereof and high lift devices D. In the preferred example shown, substantially L-shaped control units 1 and 2 form a part of the trailing edge and tips of the wings B and C, and each unit is movably secured at its forward edge by being hinged on a hollow axial support 5—5 which is substantially horizontal when the airplane is in level flight, thus enabling the control unit to be moved upwardly or downwardly at varying angles to the wing. As is customary with airplane control surfaces, the contour of the unit completes the aerodynamic section of the wing. The leading edge of the wings B and C are noted to be sharply swept back. Thus the units 1 and 2 being on the wing tips are located well back of the center of gravity of the airplane, thereby providing an effective lever arm for pitch and climb control.

Figure 3:
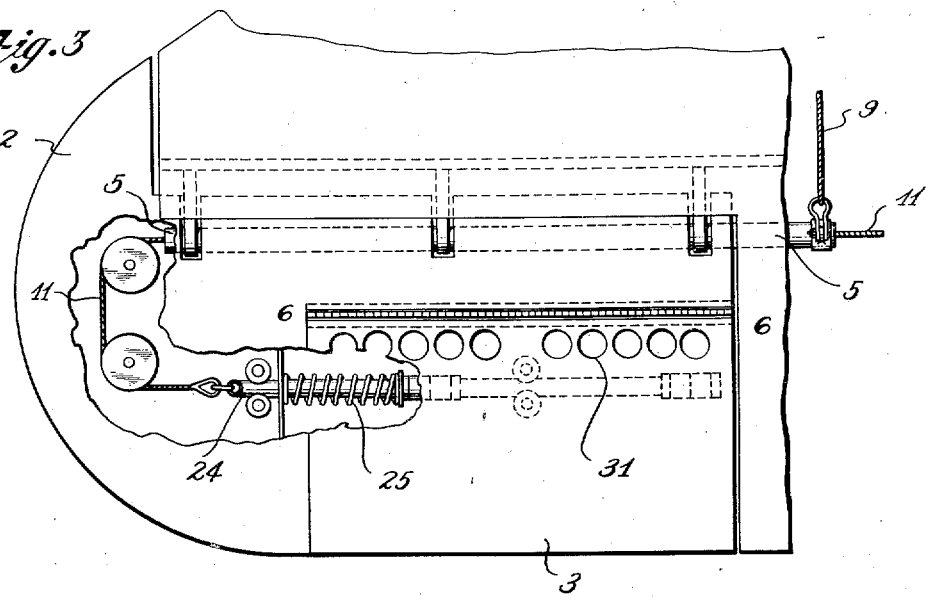
Figure 3 is a plan view of the left control unit.
Figure 4:
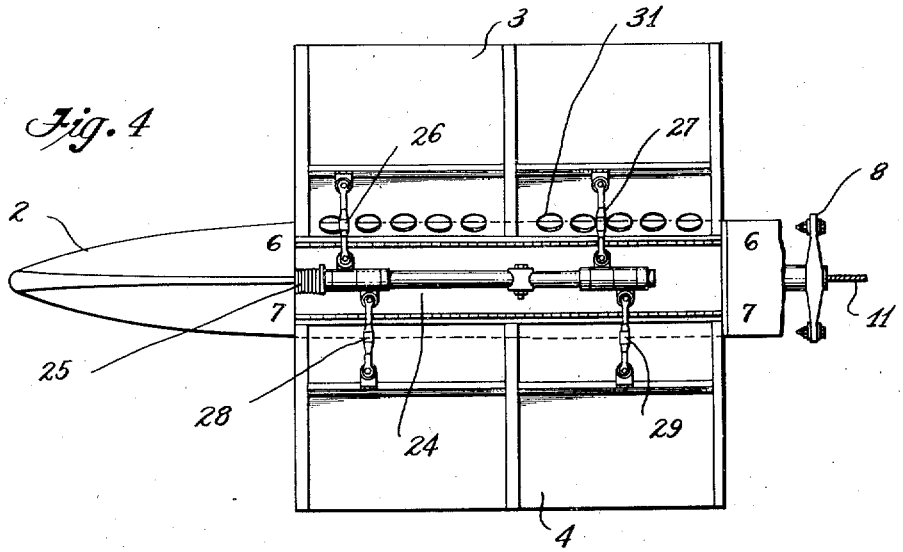
Figure 4 is a rear view of the left control unit.

A portion of the trailing edge of each control unit is cut out, and each of the spaces is provided with a pair of superposed control surfaces 3 and 4. Upper control surfaces 3 are movably secured by being hinged to the control units to rotate upwardly on axial supports 6—6, and lower control surfaces 4 are movably secured by being hinged to the control units to rotate downwardly on axial supports 7—7 (Figures 3 and 4). Supports 6—6 and 7—7 are positioned to join the leading edges of the control surfaces 3 and 4 to the control units slightly to the rear of the leading edges of the control units, thereby providing portions of the control units between the wings and the control surfaces. The control surfaces of each pair, by being so mounted, do not, when opened as will be later described, interfere mechanically with the motion of the control units on which they are mounted. When the control surfaces 3 and 4 are closed, the surface contours of the control units are substantially undisturbed.

Figure 5:
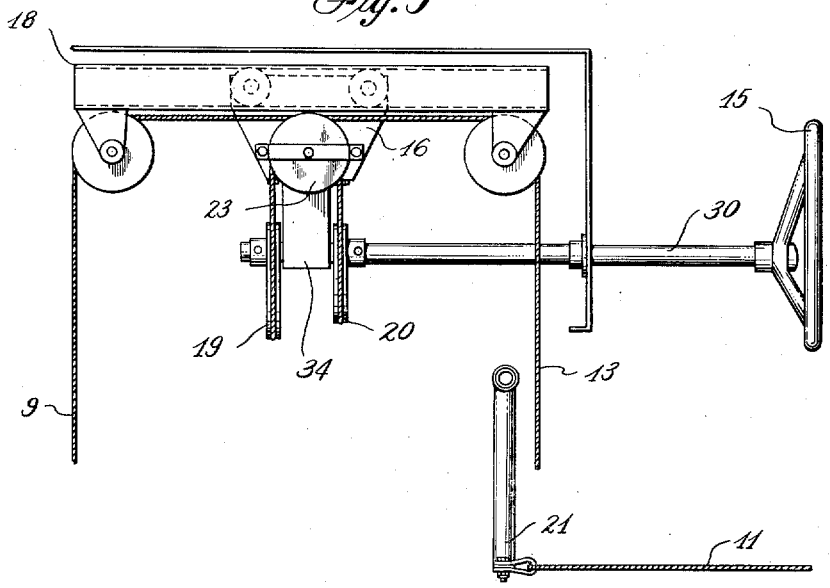
Figure 5 is a side view of a cockpit arrangement consisting of a control wheel assembly and foot pedals for operating the control elements.
Figure 6:
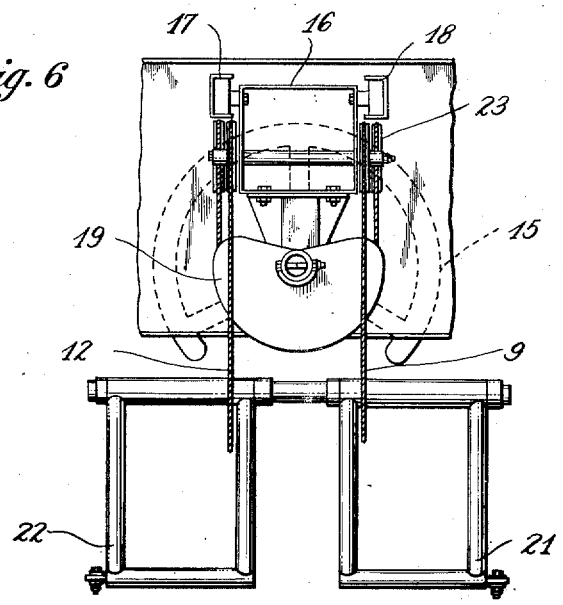
Figure 6 is a front view of the cockpit arrangement required to operate the control units.

The manner in which a pilot would operate my control system as shown in the drawings is as follows:

To raise the nose of the airplane the pilot would pull backward on the control wheel 15 (Figures 2, 5, and 6); the shaft 30 would pull the carriage 16 to the rear; this would pull on cables 9 and 12 and loosen cables 10 and 13, thus deflecting the trailing edge of the control units 1 and 2 upward, creating a positive pitching moment about the center of gravity of the airplane. Conversely a forward movement of the control wheel would deflect the control units 1 and 2 downward and produce a diving moment on the airplane.

To lower the left wing the pilot would turn control wheel 15 counterclockwise; shaft 30 would rotate quadrants 19 and 20 counterclockwise pulling on cables 9 and 13 and loosening cables 10 and 12; this would deflect the left control unit 2 upward and the right control unit 1 downward, thus producing an unsymmetrical span-wise lift distribution which would roll the airplane.

For use on some airplanes it would be desirable to make the quadrants 19 and 20 dissimilar in operating radius and the upper and lower arms of operating lever 8 of different length in order that the up movement of the control units would be greater than the down movement. This would avoid adverse yawing moments due to the unsymmetrical lift distribution.

Conversely, turning the control wheel 15 clockwise would roll the airplane clockwise.

To yaw the airplane to the left, the pilot would depress the left foot pedal 21, pulling on cable 11 which passes freely through the hollow axial support 5—5, moving member 24 to the left, as shown in Figure 4, increasing the angle of arms 26, 27, 28, and 29, thus raising the upper control surface 3 and lowering the control surface 4 (Figures 3 and 4).

Spreading the surfaces 3 and 4 would produce an aerodynamic drag on the left wing producing a turn to the left. To stop the turn, the pedal 21 would be released and the spring 25 would force member 24 to the right causing arms 26, 27, 28, and 29 to incline, thus closing surfaces 3 and 4.

Conversely, depressing pedal 22 would turn the airplane to the right.

To increase the sinking speed of the airplane the pilot would depress both pedal 21 and pedal 22. With both pedals depressed, a turn would be made by releasing pressure on the pedal on the side opposite to which the turn is made.

It would be safe to fly the airplane with the upper and lower surfaces of both control units spread as the low aerodynamic pressure between the upper and lower surfaces would cause air to flow from the upper surface of the wing through openings 31; thus preserving laminar flow over the upper surface of the wing and preventing the wing tips from stalling. It will also be noted that when flying the airplane with, for example, the control surfaces of one or both control units wholly or partly separated, the control units can still be depressed or elevated, and that either or both of the pairs of control surfaces can be separated irrespective of the position of the control units. Thus the pilot, by swinging the described control elements on their axial supports, can produce either independent or simultaneous directional, lateral and longitudinal control of the airplane at all times.

I have described one form of cable operation which could be used to operate the control units in a manner which would accomplish the objects of the invention. It is understood that push-pull or torque tubes could be used to operate the system but the method described is simple and would operate satisfactorily.

The system described would be easy to manufacture and install. The tracks 17 and 18, on which the carriage 16 travels, would be secured to the upper part of the fuselage. An opening would be provided in the instrument panel of the airplane so that the shaft 30 could pass through it. The shaft 30 would pass through the bearing support 34 and the quadrants 19 and 20 would be pinned to it.

The particular installation described leaves the floor space immediately ahead of the pilot free of controls so that an emergency exit or bomb sight could be installed in that space.

One of the particular advantages of my control system as above described for tailless airplanes is that in tailless airplanes the effective lever arm length for pitch control surfaces is short and, consequently, such surfaces must be relatively large, and that when high lift flaps are used in tailless airplanes such flaps also have to be large to adequately and safely reduce landing speeds. Thus, the pitch controls and high lift flaps together, to be most effective, may take up practically all of the trailing edge of a tailless airplane structure. By mounting the separable control surfaces 3 and 4 within a cut out portion of the control units in such a manner that the separable control surfaces 3 and 4 can operate without disturbing operation of the control units 1 and 2, I am able to utilize all the trailing edge for the high lift flaps and the control units if desired.

I claim:

1. In a tailless airplane, a fuselage, a wing surface at each side thereof, a movable control unit in each wing comprising a portion of the trailing edge of the wing and extending forwardly therefrom, means to simultaneously move said control units upwardly or downwardly or to simultaneously move one of said control units upwardly and the other downwardly or vice versa, a pair of superposed control surfaces at and extending forwardly of the trailing edge of each of said control units, each control surface of each of said pairs being movably mounted on a control unit in respect to the other to permit the upper control surface to be moved upwardly and the lower control surface downwardly in respect to the control unit on which said control surfaces are mounted, air passageways in the upper control surface of each of said pair of control surfaces to permit airflow through said surfaces to preserve laminar flow over the upper surfaces of the wings when said upper control surfaces are elevated, means to separate one of said pair of control surfaces independently of the other or to separate both of said pairs simultaneously, the parts operating whereby either independent or simultaneous directional, lateral and longitudinal control of said airplane is obtained and permitting the imposition of a drag upon the airplane to increase its sinking speed without causing either directional control or the stalling of the airplane wing tips.

2. In a tailless airplane, a fuselage, a wing at each side thereof, a substantially horizontally disposed control unit forming a part of the trailing edge of each wing and movably secured at its forward edge to said wing for movement about a horizontal axis, a pair of superposed substantially horizontally disposed control surfaces forming a part of the trailing edge and a part of the upper and lower surfaces of each of said control units, the upper control surface of each of said pair of control surfaces provided adjacent its forward edge with air passageways, each of said surfaces at its forward edge secured to said control unit for movement about a horizontal axis, and means operable by the pilot for swinging said control units and surfaces upon their axial supports to produce either independent or simultaneous directional, lateral and longitudinal control of said airplane.

3. In a tailless airplane, a fuselage, a wing surface at each side thereof, a movable control unit in each wing, said control units being substantially L-shaped, the heads of said control units constituting the tips for the ends of said wings, the stem of said control units constituting a portion of the trailing edges of said wings, means to simultaneously move said control units upwardly or downwardly to provide longitudinal control of the airplane or to move one of said control units upwardly or downwardly to provide lateral control of the said airplane, a pair of superposed control surfaces in the trailing edge of each of said control units and mounted in the stem portions of said control units, the upper control surface of each of said pair of control surfaces being provided with passageways to permit the flow of air therethrough from the upper surface of the wings into the low pressure region created between the deflected upper and lower surfaces of said control units to preserve laminar flow over said wing upper surfaces, each control surface of each of said pairs being movable in respect to the other whereby the upper control surface can be moved upwardly and the lower control surface downwardly, and means to separate one of said pairs of control surfaces independently of the other or to separate both of said pairs of control surfaces simultaneously, the parts operating whereby either independent or simultaneous directional, lateral and longitudinal control of the airplane is provided.

4. In a tailless airplane, a fuselage, a wing surface at each side thereof, the tip and a portion of the trailing edge adjacent the tip of each wing being cut out, a control unit in each wing constituting the tip of the wing and filling a portion of the cut out space, a pair of superposed control surfaces forming a part of each control unit and filling in the remaining cut out space of said wings, the upper and lower control surfaces being movable in respect to one another, each of the upper control surfaces of each of said pair of control surfaces being provided with passageways to permit the flow of air therethrough from the upper surface of the wings into the low pressure region created between the deflected upper and lower surfaces of said control unit to preserve laminar flow over said wing upper surfaces.

5. In a tailless airplane having a fuselage and a wing at each side thereof, means for controlling said airplane in normal flight solely by horizontally disposed surfaces comprising a substantially horizontally disposed control unit forming a part of the trailing edge of each wing and movably secured along its forward edge to said wing for movement about a horizontal axis, a pair of superposed substantially horizontally disposed control surfaces forming a part of the trailing edge and a part of the upper and lower surfaces of each of said control units, said control units having a portion disposed forward of and extending along the forward edges of the upper control surface of each of said pair of control surfaces, each of said control surfaces at its forward edge secured to said control unit for movement about one of a pair of vertically spaced horizontal axes in its control unit, and means operable by the pilot connected to swing said control units and surfaces upon their axial supports either independently or simultaneously.

6. In a tailless airplane having a fuselage and a wing at each side thereof, means for controlling said airplane in all flight aspects solely by horizontally disposed surfaces comprising a substantially horizontally disposed control unit forming a part of the trailing edge of each wing at the tip thereof and movably secured along its forward edge to said wing for movement about a horizontal axis, a pair of superposed substantially horizontally disposed control surfaces forming a part of the trailing edge and a part of the upper and lower surfaces of each of said control units, said control units having a portion disposed forward of and extending along the forward edges of the upper control surface of each of said pair of control surfaces, each of said control surfaces at its forward edge secured to said control unit for movement about one of a pair of vertically spaced horizontal axes in its control unit, means operable by the pilot connected to independently or simultaneously swing said control units and surfaces upon their axial supports, a horizontally disposed high lift flap including a portion of the trailing edge of each wing between said control units and said fuselage, said airplane being capable of take-off, flight, and landing control by operation of said units, surfaces, and flap.

7. In a tailless airplane, a fuselage, a wing at each side thereof, a substantially horizontally disposed control unit forming a part of the trailing edge of each wing at the tips thereof and movably secured at its forward edge to said wing for movement about a horizontal axis, a pair of superposed substantially horizontally disposed control surfaces forming a part of the trailing edge and a part of the upper and lower surfaces of each of said control units, each of said control surfaces at its forward edge being secured to said control unit for movement about a horizontal axis, and pilot operated means connected to swing said control units and surfaces upon their axial supports either independently or simultaneously.

8. In a tailless airplane, means capable of longitudinally, laterally, and vertically controlling said airplane in normal flight consisting of a control unit constituting a minor portion of the trailing edge of said airplane at each wing tip, each of said control units being movably secured along its forward edge to the wing of said airplane for movement about a horizontal axis, pilot operated means connected to move said control units simultaneously for vertical control of said airplane or independently for lateral control of said airplane, a pair of separable control surfaces forming a part of the upper and lower surfaces of each of said control units at the trailing edge thereof, each of the control surfaces of a pair being secured to said control unit for movement about one of a pair of vertically spaced horizontal axes in its control unit, and pilot operated means connected to separate said control surfaces independently for directional control of said airplane by creation of unilateral drag or simultaneously to create a bilateral drag, irrespective of the position of said control units.

9. An airplane according to claim 7 wherein the leading edge of each wing is swept back to place said control units rearwardly of the center of gravity of said airplane to obtain effective pitching or climbing moments when said units are simultaneously swung in the same direction.

JOHN DONALD McKELLAR.

REFERENCES CITED

The following references are of record in the file of this patent:

UNITED STATES PATENTS

| Number | Name | Date |
|---|---|---|
| 1,600,671 | Hill | Sept. 21, 1926 |
| 1,981,700 | Hoffman | Nov. 20, 1934 |
| 2,127,864 | Girard | Aug. 23, 1938 |
| 2,191,842 | Back | Feb. 27, 1940 |

FOREIGN PATENTS

| Number | Country | Date |
|---|---|---|
| 7,131 | Great Britain | 1910 |
| 717,575 | France | Oct. 20, 1931 |
| 748,398 | France | Apr. 18, 1933 |
| 795,797 | France | Mar. 21, 1936 |